(12) United States Patent
Al-Arfaj et al.

(10) Patent No.: US 11,254,851 B2
(45) Date of Patent: *Feb. 22, 2022

(54) VULCANIZED RUBBER AND DATE TREE BASED LOST CIRCULATION MATERIAL (LCM) BLEND

(71) Applicant: Saudi Arabian Oil Company, Dhahran (SA)

(72) Inventors: Mohammed Al-Arfaj, Dammam Corniche (SA); Raed Al-Ouhali, Dhahran (SA); Md Amanullah, Dhahran (SA); Mohammed Al-Otaibi, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

This patent is subject to a terminal disclaimer.

(21) Appl. No.: 16/912,252

(22) Filed: Jun. 25, 2020

(65) Prior Publication Data

US 2021/0403790 A1    Dec. 30, 2021

(51) Int. Cl.
*C09K 8/42* (2006.01)
*C09K 8/44* (2006.01)

(52) U.S. Cl.
CPC ............. *C09K 8/426* (2013.01); *C09K 8/44* (2013.01)

(58) Field of Classification Search
None
See application file for complete search history.

(56) References Cited

U.S. PATENT DOCUMENTS 2,483,936 A   10/1949   Roberts
2,600,404 A    6/1952   Hoeppel
(Continued)

FOREIGN PATENT DOCUMENTS

AU    2014223850 B2    9/2014
CN    101311243 A    11/2008
(Continued)

OTHER PUBLICATIONS

Ramasamy, Jothibasu et al.; "Novel Fibrous Lost Circulation Materials Derived from Deceased Date Tree Waste" SPE-187989-MS, SPE Kingdom of Saudi Arabia Annual Technocal Symposium & Exhibition, Dammam, Apr. 24-27, 2017; pp. 1-8.
(Continued)

*Primary Examiner* — Angela M DiTrani Leff
(74) *Attorney, Agent, or Firm* — Bracewell LLP; Constance G. Rhebergen; Brian H. Tompkins (57) ABSTRACT

A vulcanized rubber and date tree based lost circulation material (LCM) is provided. The vulcanized rubber and date tree based LCM includes vulcanized rubber particles, date tree seed particles produced from date tree seeds, and date tree fibers produced from date tree waste. The LCM may include vulcanized rubber particles in the range of 20 pounds-per-barrel (ppb) to 40 ppb in the drilling fluid, date tree seed particles in the range of 50 ppb to 70 ppb in the drilling fluid, and date tree fibers in the range of 10 ppb to 40 ppb in a drilling fluid, including a first size of fibers in the range of 5 ppb to 20 ppb, and a second size of fibers in the range of 5 ppb to 20 ppb. Methods of lost circulation control and manufacture of the vulcanized rubber and date tree based LCM are also provided.

12 Claims, 1 Drawing Sheet

(56) References Cited

U.S. PATENT DOCUMENTS

| | | |
|---|---|---|
| 2,749,308 A | 6/1956 | Beckum et al. |
| 2,779,417 A | 1/1957 | Clark, Jr. et al. |
| 2,789,948 A | 4/1957 | Tronolone |
| 2,811,488 A | 10/1957 | Nestle et al. |
| 2,912,380 A | 11/1959 | Groves |
| 2,943,679 A | 7/1960 | Scott, Jr. |
| 2,943,680 A | 7/1960 | Scott et al. |
| 3,147,127 A | 9/1964 | Shannon |
| 3,217,801 A | 11/1965 | Fast et al. |
| 4,086,098 A | 4/1978 | Le Ruyet et al. |
| 4,110,225 A | 8/1978 | Cagle |
| 4,127,548 A | 11/1978 | Alexander |
| 4,247,403 A | 1/1981 | Foley et al. |
| 4,275,788 A | 6/1981 | Sweatman |
| 4,428,844 A | 1/1984 | Wagener |
| 4,474,665 A | 10/1984 | Green |
| 4,579,668 A | 4/1986 | Messenger |
| 4,619,772 A | 10/1986 | Black et al. |
| 4,836,940 A | 6/1989 | Alexander |
| 4,957,166 A | 9/1990 | Sydansk |
| 5,004,553 A | 4/1991 | House et al. |
| 5,114,893 A | 5/1992 | Hughes |
| 5,118,664 A | 6/1992 | Burts, Jr. |
| 5,197,324 A | 3/1993 | Keys |
| 5,332,724 A | 7/1994 | Burts, Jr. |
| 5,484,028 A | 1/1996 | Rose |
| 5,501,275 A | 3/1996 | Card et al. |
| 5,801,127 A | 9/1998 | Duhon, Sr. |
| 6,016,879 A | 1/2000 | Burts, Jr. |
| 6,098,712 A | 8/2000 | Burts, Jr. |
| 6,102,121 A | 8/2000 | Burts, Jr. |
| 6,258,757 B1 | 7/2001 | Sweatman et al. |
| 6,271,001 B1 | 8/2001 | Clarke et al. |
| 6,350,594 B1 | 2/2002 | Clarke et al. |
| 6,518,224 B2 | 2/2003 | Wood |
| 6,716,798 B1 | 4/2004 | Burts, Jr. |
| 6,750,179 B1 | 6/2004 | Burts, Jr. |
| 6,790,812 B2 | 9/2004 | Halliday |
| 6,806,232 B1 | 10/2004 | Cart |
| 6,814,798 B2 | 11/2004 | Vijn et al. |
| 6,861,392 B2 | 3/2005 | Shaarpour |
| 6,932,158 B2 | 8/2005 | Burts |
| 7,226,895 B2 | 6/2007 | Xiang |
| 7,271,131 B2 | 9/2007 | Halliday et al. |
| 7,284,611 B2 | 10/2007 | Reddy et al. |
| 7,297,662 B2 | 11/2007 | Verret |
| 7,297,663 B1 | 11/2007 | Kilchrist et al. |
| 7,332,026 B2 | 2/2008 | Fyten et al. |
| 7,488,705 B2 | 2/2009 | Reddy et al. |
| 7,507,692 B2 | 3/2009 | Xiang |
| 7,537,054 B2 | 5/2009 | Reddy et al. |
| 7,541,317 B2 | 6/2009 | Pomerleau |
| 7,629,297 B2 | 12/2009 | Shaarpour |
| 7,744,689 B2 | 6/2010 | Hojaji et al. |
| 7,795,184 B2 | 9/2010 | Pomerleau |
| 7,902,126 B1 | 3/2011 | Burts, Jr. |
| 7,923,413 B2 | 4/2011 | Ghassemzadeh |
| 7,964,537 B2 | 6/2011 | Rayborn, Sr. et al. |
| 8,371,381 B2 | 2/2013 | Shindgikar et al. |
| 8,383,558 B2 | 2/2013 | Reddy et al. |
| 8,404,622 B2 | 3/2013 | Ghassemzadeh |
| 8,673,825 B2 | 3/2014 | Rayborn, Sr. et al. |
| 8,739,872 B1 | 6/2014 | Miller et al. |
| 8,776,882 B2 | 7/2014 | Shindgikar et al. |
| 8,887,808 B2 | 11/2014 | Kumar et al. |
| 8,935,957 B2 | 1/2015 | Kulkarni et al. |
| 8,992,670 B1 | 3/2015 | Vohra |
| 9,140,118 B2 | 9/2015 | Kulkarni et al. |
| 9,175,529 B2 | 11/2015 | Jamison et al. |
| 9,290,687 B1 | 3/2016 | Weaver |
| 9,376,607 B2 | 6/2016 | James |
| 9,410,066 B2 | 8/2016 | Ghassemzadeh |
| 9,416,306 B2 | 8/2016 | Savari et al. |
| 9,453,156 B2 | 9/2016 | Wu |
| 9,505,659 B2 | 11/2016 | Bickbau |
| 9,592,488 B2 | 3/2017 | Yusuf et al. |
| 9,623,067 B1 | 4/2017 | Awad et al. |
| 9,688,901 B2 | 6/2017 | Fontenot |
| 9,783,727 B2 | 10/2017 | Lahman et al. |
| 9,957,433 B2 | 5/2018 | Amanullah et al. |
| 10,023,781 B2 | 7/2018 | Amanullah |
| 10,240,411 B1* | 3/2019 | Amanullah ........... E21B 21/003 |
| 10,259,982 B2 | 4/2019 | Amanullah |
| 10,266,742 B1 | 4/2019 | Amanullah et al. |
| 10,323,170 B1 | 6/2019 | Amanullah et al. |
| 10,329,470 B1 | 6/2019 | Amanullah et al. |
| 10,336,930 B2 | 7/2019 | Amanullah |
| 10,392,549 B2 | 8/2019 | Amanullah et al. |
| 10,414,965 B2 | 9/2019 | Amanullah |
| 10,479,920 B2 | 11/2019 | Amanullah et al. |
| 10,487,253 B2 | 11/2019 | Amanullah |
| 10,494,558 B2 | 12/2019 | Amanullah |
| 10,513,647 B2 | 12/2019 | Amanullah |
| 10,519,357 B2 | 12/2019 | Amanullah |
| 10,544,345 B2 | 1/2020 | Amanullah |
| 10,597,575 B2 | 3/2020 | Amanullah et al. |
| 10,619,433 B2 | 4/2020 | Amanullah |
| 10,889,747 B1 | 1/2021 | Amanullah |
| 10,895,118 B2* | 1/2021 | Amanullah ............... C09K 8/32 |
| 10,927,282 B2* | 2/2021 | Amanullah ............ C09K 8/035 |
| 11,041,347 B1 | 6/2021 | Amanullah |
| 11,136,487 B2 | 10/2021 | Amanullah et al. |
| 2002/0010100 A1 | 1/2002 | Wood |
| 2004/0023813 A1 | 2/2004 | Burts, III |
| 2004/0129460 A1 | 7/2004 | MacQuoid et al. |
| 2004/0244978 A1 | 12/2004 | Shaarpour |
| 2005/0113260 A1 | 5/2005 | Wood |
| 2005/0124502 A1 | 6/2005 | Shaarpour |
| 2005/0217852 A1 | 10/2005 | Bennett et al. |
| 2006/0106136 A1 | 5/2006 | Abu-Sharkh |
| 2006/0122069 A1 | 6/2006 | Burts, III |
| 2006/0157247 A1 | 7/2006 | Burts, III |
| 2006/0160907 A1 | 7/2006 | Stamp |
| 2009/0054269 A1 | 2/2009 | Chatterji et al. |
| 2009/0286697 A1 | 11/2009 | Shaarpour |
| 2009/0305038 A1 | 12/2009 | Duran et al. |
| 2009/0305911 A1 | 12/2009 | Pomerleau |
| 2010/0152070 A1 | 6/2010 | Ghassemzadeh |
| 2010/0181110 A1 | 7/2010 | Harr |
| 2010/0193244 A1 | 8/2010 | Hoskins |
| 2010/0230164 A1 | 9/2010 | Pomerleau |
| 2010/0230169 A1 | 9/2010 | Pomerleau |
| 2011/0214870 A1 | 9/2011 | Shaarpour |
| 2011/0278006 A1 | 11/2011 | Sanders |
| 2012/0055852 A1 | 3/2012 | Soane et al. |
| 2012/0157354 A1 | 6/2012 | Li et al. |
| 2012/0247763 A1 | 10/2012 | Rakitsky et al. |
| 2013/0025863 A1 | 1/2013 | Lin et al. |
| 2013/0206479 A1 | 8/2013 | Smith |
| 2014/0038857 A1 | 2/2014 | Miller et al. |
| 2014/0102987 A1 | 4/2014 | Yusuf et al. |
| 2014/0110177 A1 | 4/2014 | Harr |
| 2014/0238674 A1 | 4/2014 | Savari et al. |
| 2014/0135237 A1 | 5/2014 | Villarreal, Jr. et al. |
| 2014/0209290 A1 | 7/2014 | Jamison et al. |
| 2014/0231082 A1 | 8/2014 | Jamison et al. |
| 2014/0262281 A1 | 9/2014 | Kulkarni et al. |
| 2014/0318793 A1 | 10/2014 | Van Petergem et al. |
| 2014/0353043 A1 | 12/2014 | Amanullah et al. |
| 2015/0008044 A1 | 1/2015 | Fontenot |
| 2015/0051120 A1 | 2/2015 | Hurd et al. |
| 2015/0072901 A1 | 3/2015 | Samuel et al. |
| 2015/0166875 A1 | 6/2015 | Bird et al. |
| 2015/0247081 A1 | 9/2015 | Dillon et al. |
| 2015/0251156 A1 | 9/2015 | Yusuf et al. |
| 2015/0292279 A1 | 10/2015 | Wang |
| 2016/0060985 A1 | 3/2016 | Lin et al. |
| 2016/0096988 A1 | 4/2016 | Lin et al. |
| 2016/0137903 A1 | 5/2016 | Friedheim et al. |
| 2016/0177164 A1 | 6/2016 | Dillon et al. |
| 2016/0222274 A1 | 8/2016 | Hoskins |
| 2016/0222275 A1 | 8/2016 | Galindo et al. |
| 2016/0257869 A1 | 9/2016 | Kulkarni et al. |
| 2016/0264839 A1 | 9/2016 | Mata et al. |

(56) References Cited

U.S. PATENT DOCUMENTS

| | | | |
|---|---|---|---|
| 2016/0289528 A1 | 10/2016 | Wagle et al. | |
| 2016/0333257 A1* | 11/2016 | Smith, Jr. | C09K 8/805 |
| 2017/0058180 A1 | 3/2017 | Hossain et al. | |
| 2017/0166795 A1 | 6/2017 | Walker et al. | |
| 2017/0240791 A1 | 8/2017 | Oliveira et al. | |
| 2018/0002589 A1 | 1/2018 | Amanullah | |
| 2018/0086962 A1 | 3/2018 | Amanullah | |
| 2018/0201819 A1* | 7/2018 | Amanullah | C09K 8/035 |
| 2019/0177593 A1 | 6/2019 | Amanullah | |
| 2019/0177594 A1 | 6/2019 | Amanullah | |
| 2019/0177595 A1 | 6/2019 | Amanullah | |
| 2019/0185731 A1 | 6/2019 | Amanullah | |
| 2019/0185732 A1 | 6/2019 | Amanullah | |
| 2019/0194519 A1 | 6/2019 | Amanullah | |
| 2019/0233705 A1 | 8/2019 | Amanullah et al. | |
| 2019/0233706 A1 | 8/2019 | Adewole et al. | |
| 2019/0249061 A1 | 8/2019 | Alouhali et al. | |
| 2019/0270924 A1 | 9/2019 | Amanullah | |
| 2019/0292860 A1 | 9/2019 | Amanullah | |
| 2019/0292861 A1 | 9/2019 | Amanullah | |
| 2019/0375973 A1 | 12/2019 | Amanullah | |
| 2020/0002592 A1 | 1/2020 | Amanullah | |
| 2020/0079987 A1 | 3/2020 | Amanullah | |
| 2020/0079988 A1 | 3/2020 | Amanullah | |
| 2020/0317980 A1 | 10/2020 | Amanullah et al. | |
| 2021/0062063 A1 | 3/2021 | Amanullah et al. | |

FOREIGN PATENT DOCUMENTS

| | | |
|---|---|---|
| CN | 101560084 A | 10/2009 |
| CN | 101724383 A | 6/2010 |
| CN | 102127403 A | 7/2011 |
| CN | 203035080 U | 7/2013 |
| CN | 103570298 A | 2/2014 |
| CN | 103740346 A | 4/2014 |
| CN | 104087274 A | 10/2014 |
| CN | 104419392 A | 3/2015 |
| CN | 105541159 A | 5/2016 |
| GB | 2506603 A | 4/2014 |
| GB | 2518441 A | 3/2015 |
| JP | 0671171 A | 3/1994 |
| WO | 200153429 A1 | 7/2001 |
| WO | 2004013448 A2 | 2/2004 |
| WO | 2010019535 A2 | 2/2010 |
| WO | 2010088484 A2 | 8/2010 |
| WO | 2010142370 A1 | 12/2010 |
| WO | 2012037600 A1 | 3/2012 |
| WO | 2013039938 A1 | 3/2013 |
| WO | 2014008598 A1 | 1/2014 |
| WO | 2014197417 A1 | 12/2014 |
| WO | 2015142156 A1 | 9/2015 |
| WO | 2015199652 A1 | 12/2015 |
| WO | 2016019416 A1 | 2/2016 |
| WO | 2016028470 A1 | 2/2016 |
| WO | 2017087434 A1 | 5/2017 |
| WO | 2018005575 A1 | 1/2018 |
| WO | 2018013619 A1 | 1/2018 |

OTHER PUBLICATIONS

Alawad, Musaed N.J., et al.; "Superior fracture-seal material using crushed date palm seeds for oil and gas well drilling operations" Journal of King Saud University—Engineering Sciences (2017); pp. 1-7.

Al-Awad, Musaed NJ et al.; "Utilization of Shredded Waste Car Tyres as a Fracture Seal Material (FSM) in Oil and Gas Drilling Operations" Journal of Petroleum & Environmental Biotechnology, (2017) vol. 8, Issue 2; pp. 1-4.

Alsaba, M. et al.; "Review of lost circulation materials and treatments with an updated classification." AADE National Technical Conference and Exhibition, Houston, TX, Apr. 2014; pp. 1-9.

Amanullah, et al.; "Application of an indigenous eco-friendly raw material as fluid loss additive", Journal of Petroleum Science and Engineering, vol. 139, (2016); pp. 191-197.

Amanullah; "Characteristics, behavior and performance of ARC Plug-A date seed-based sized particulate LCM." SPE Kingdom of Saudi Arabia Annual Technical Symposium and Exhibition. Society of Petroleum Engineers, 2016; pp. 1-9.

International Search Report and Written Opinion for International Application No. PCT/US2016/062130; Report dated Jan. 27, 2017; pp. 1-12.

International Search Report and Written Opinion for International Application No. PCT/US2017/039614; Report dated Sep. 11, 2017; pp. 1-12.

International Search Report and Written Opinion for International Application No. PCT/US2017/039616; Report dated Sep. 11, 2017; pp. 1-11.

International Search Report and Written Opinion for International Application No. PCT/US2017/047877; Report dated Oct. 27, 2017; pp. 1-15.

International Search Report and Written Opinion for International Application No. PCT/US2017/053355; International filing date Sep. 26, 2017; Report dated Jan. 17, 2018; pp. 1-14.

International Search Report and Written Opinion for International Application No. PCT/US2017/060079; International Filing Date Nov. 6, 2017; Report dated Dec. 18, 2017; pp. 1-14.

International Search Report and Written Opinion for International Application No. PCT/US2017/067179 International Filing Date Dec. 19, 2017; Report dated Feb. 21, 2018; pp. 1-14.

International Search Report and Written Opinion for International Application No. PCT/US2019/016614 report dated Jun. 3, 2019; pp. 1-12.

International Search Report and Written Opinion for International Application No. PCT/US2019/022843 report dated Jun. 3, 2019; pp. 1-13.

International Search Report and Written Opinion for International Application No. PCT/US2017/041611; International Filing Date Jul. 12, 2017; Report dated Oct. 27, 2017 (pp. 1-15).

International Search Report and Written Opinion for International Application No. PCT/US2018/034291; International Filing Date May 24, 2018; Report dated Jul. 31, 2018 (pp. 1-11).

International Search Report and Written Opinion for International Application No. PCT/US2018/048423; International Filing Date Aug. 29, 2018; Report dated Nov. 29, 2018 (pp. 1-12).

Saudi Aramco "Local palm trees support technical solutions" Dhahran, Aug. 4, 2015; available as of Sep. 19, 2018 at the website: www.saudiaramco.com/en/home/news-media/news/local-palm-trees-support.html.

Wajheeuddin, M. et al.; "An Experimental Study on Particle Sizing of Natural Substitutes for Drilling Fluid Applications." Journal of Nature Science and Sustainable Technology vol. 8, No. 2 (2014); pp. 1-14.

Wajheeuddin, Mohammed; "Development of an Environmentally-Friendly Drilling Fluid Using Date Seeds and Grass" Master's thesis, King Fahd University of Petroleum & Minerals, 2014; pp. 1-138.

International Search Report and Written Opinion for International Application No. PCT/US2021/019673, report dated Jun. 18, 2021; pp. 1-14.

International Search Report and Written Opinion for International Application No. PCT/US2021/025902, report dated Jul. 15, 2021; pp. 1-14.

* cited by examiner

VULCANIZED RUBBER AND DATE TREE BASED LOST CIRCULATION MATERIAL (LCM) BLEND

BACKGROUND

Field of the Disclosure

The present disclosure generally relates to controlling lost circulation in a wellbore during drilling with a drilling fluid. More specifically, embodiments of the disclosure relate to a lost circulation material (LCM) having a mix of resilient and rigid components.

Description of the Related Art

Lost circulation is one of the frequent challenges encountered during drilling operations. Lost circulation can be encountered during any stage of operations and occurs when drilling fluid (such as drilling mud) pumped into a well only partially returns or does not return to the surface. While some fluid loss is expected, excessive fluid loss is not desirable from a safety, an economical, or an environmental point of view. Lost circulation is associated with problems with well control, borehole instability, pipe sticking, unsuccessful production tests, poor hydrocarbon production after well completion, and formation damage due to plugging of pores and pore throats by mud particles. Lost circulation problems may result in several days or weeks of non-productive time (NPT). In extreme cases, lost circulation problems may force abandonment of a well.

Lost circulation can occur in various formations, such as naturally fractured formations, cavernous formations, and highly permeable formations. Lost circulation can be categorized by the amount of fluid or mud lost as seepage type, moderate type, severe type, and total loss. The extent of the fluid loss and the ability to control the lost circulation with an LCM depends on the type of formation in which the lost circulation occurs.

SUMMARY

LCMs may include granular or fibrous-type LCMs. Conventional rigid LCMs form seals and plugs with no or negligible ductility, malleability and resiliency characteristics. Consequently, the seals and plugs often fail under changing borehole conditions, such as high surge and swabbing pressure, tectonic activities, effective stress change, etc. Graphite-based resilient materials may be used in LCM pill design to improve the ductility, malleability and resiliency behavior of form seals and plugs. However, graphite-based materials may be relatively expensive and have limited local availability, as well as limited ductility and resiliency.

Embodiments of the disclosure include a lost circulation material (LCM) having a mix of vulcanized rubber particles with date tree seed particles or date tree fibers (that is, fibers formed from components of the date tree such as trunks) or a combination thereof. In some embodiments, the vulcanized rubber and date tree LCM is a trinary blend of vulcanized rubber particles, date tree seed particles, and date tree fibers. In some embodiments, the vulcanized rubber and date tree LCM is a binary blend of vulcanized rubber particles and date tree seed particles. In some embodiments, the vulcanized rubber and date tree LCM is a binary blend of vulcanized rubber particles and date tree fibers.

The LCMs described in the disclosure may form structures (for example, plugs or seals) in subsurface fractures and apertures. The binary blends or trinary blend of relatively rigid date tree seed particles, relatively flexible date tree fibers, and relatively resilient vulcanized rubber particles may improve the mechanical characteristics of formed structures (for example, seals or plugs) and improve the success rate of LCM treatment operations. The vulcanized rubber and date tree based LCMs may perform by adsorbing strain energy when deformed elastically under downhole conditions (that is, temperature and pressure) and then desorb the strain energy when the near wellbore in-situ stress changes with the relief of pressure. The vulcanized rubber and date tree based LCMs may form a structure having an improved ductility as compared to existing LCMs so that the structure may deform without failure under changing subsurface tensile, compressive, and shear stresses to maintain the integrity of the structure.

In one embodiment, a method to prevent lost circulation of a drilling fluid in a wellbore is provided. The method includes introducing an altered drilling fluid into the wellbore such that the altered drilling fluid contacts the lost circulation zone and reduces a rate of lost circulation into the lost circulation zone, such that the altered drilling fluid includes a drilling fluid and a lost circulation material (LCM). The LCM includes a plurality of particles produced from date tree seeds, a plurality of vulcanized rubber particles, and a plurality of fibers produced from date tree trunks.

In some embodiments, the altered drilling fluid consists of the drilling fluid and the LCM. In some embodiments, the drilling fluid is a water-based drilling mud or an oil-based drilling mud. In some embodiments, the LCM consists of the plurality of particles produced from date tree seeds, the plurality of vulcanized rubber particles, and the plurality of fibers produced from date tree trunks. In some embodiments, the plurality of particles produced from date tree seed is in the range of 50 ppb to 70 ppb in the altered drilling fluid, the plurality of vulcanized rubber particles is in the range of 20 ppb to 40 ppb in the altered drilling fluid, and the plurality of fibers produced from date tree trunks is in the range of 10 ppb to 40 ppb in the altered drilling fluid. In some embodiments, each of the plurality of particles produced from date tree seeds has a diameter in the range of greater than 149 microns to less than 4000 microns. In some embodiments, the plurality of fibers produced from date tree trunks includes a first group of fibers each having a size in the range of 250 microns to less than 4000 microns and a second group of fibers each having a size in the range of 150 microns to less than 1000 microns. In some embodiments, the plurality of particles produced from date tree seeds includes a plurality of untreated particles produced from untreated date tree seeds. In some embodiments, the plurality of fibers produced from date tree trunks includes a plurality of untreated fibers produced from untreated date tree trunks. In some embodiments, each of the plurality of vulcanized rubber particles has a size in the range of 0.595 millimeters to 1.19 mm.

In another embodiment, an altered drilling fluid is provided. The altered drilling fluid includes a drilling fluid and a lost circulation material. The LCM includes a plurality of particles produced from date tree seeds, a plurality of vulcanized rubber particles, and a plurality of fibers produced from date tree trunks.

In some embodiments, the altered drilling fluid consists of the drilling fluid and the LCM. In some embodiments, the drilling fluid is a water-based drilling mud or an oil-based drilling mud. In some embodiments, the LCM consists of the plurality of particles produced from date tree seeds, the plurality of vulcanized rubber particles, and the plurality of fibers produced from date tree trunks. In some embodiments, the plurality of particles produced from date tree seed is in the range of 50 ppb to 70 ppb in the altered drilling fluid, the plurality of vulcanized rubber particles is in the range of 20 ppb to 40 ppb in the altered drilling fluid, and the plurality of fibers produced from date tree trunks is in the range of 10 ppb to 40 ppb in the altered drilling fluid. In some embodiments, each of the plurality of particles produced from date tree seeds has a diameter in the range of greater than 149 microns to less than 4000 microns. In some embodiments, the plurality of fibers produced from date tree trunks includes a first group of fibers each having a size in the range of 250 microns to less than 4000 microns and a second group of fibers each having a size in the range of 150 microns to less than 1000 microns. In some embodiments, each of the plurality of vulcanized rubber particles has a size in the range of 0.595 millimeters to 1.19 mm.

In another embodiment, a lost circulation material (LCM) composition is provided. The LCM composition includes a plurality of particles produced from date tree seeds, a plurality of vulcanized rubber particles, and a plurality of fibers produced from date tree trunks.

In some embodiments, the LCM consists of the plurality of particles produced from date tree seeds, the plurality of vulcanized rubber particles, and the plurality of fibers produced from date tree trunks. In some embodiments, the plurality of particles produced from date tree seed is in the range of 50 ppb to 70 ppb in the altered drilling fluid, the plurality of vulcanized rubber particles is in the range of 20 ppb to 40 ppb in the altered drilling fluid, and the plurality of fibers produced from date tree trunks is in the range of 10 ppb to 40 ppb in the altered drilling fluid. In some embodiments, each of the plurality of particles produced from date tree seeds has a diameter in the range of greater than 149 microns to less than 4000 microns. In some embodiments, the plurality of fibers produced from date tree trunks includes a first group of fibers each having a size in the range of 250 microns to less than 4000 microns and a second group of fibers each having a size in the range of 150 microns to less than 1000 microns. In some embodiments, each of the plurality of vulcanized rubber particles has a size in the range of 0.595 millimeters to 1.19 mm.

In another embodiment, a method of manufacturing a lost circulation material (LCM) is provided. The method includes processing date tree seeds to produce a plurality of particles produced from date tree seeds, processing date tree trunks to produce a plurality of fibers, and obtaining a plurality of vulcanized rubber particles. The method further includes mixing a first amount of the first plurality of particles, a second amount of the plurality of fibers, and a third amount of the plurality of vulcanized rubber particles.

In some embodiments, the method includes processing the date tree seeds to produce the plurality of particles comprises grinding the date tree seeds. In some embodiments, each of the plurality of particles produced from date tree seeds has a diameter in the range of greater than 149 microns to less than 4000 microns. In some embodiment, the plurality of fibers produced from date tree trunks include a first group of fibers each having a size in the range of 250 microns to less than 4000 microns and a second group of fibers each having a size in the range of 150 microns to less than 1000 microns. In some embodiments, each of the plurality of vulcanized rubber particles has a size in the range of 0.595 millimeters to 1.19 mm.

DETAILED DESCRIPTION

Figure 1:
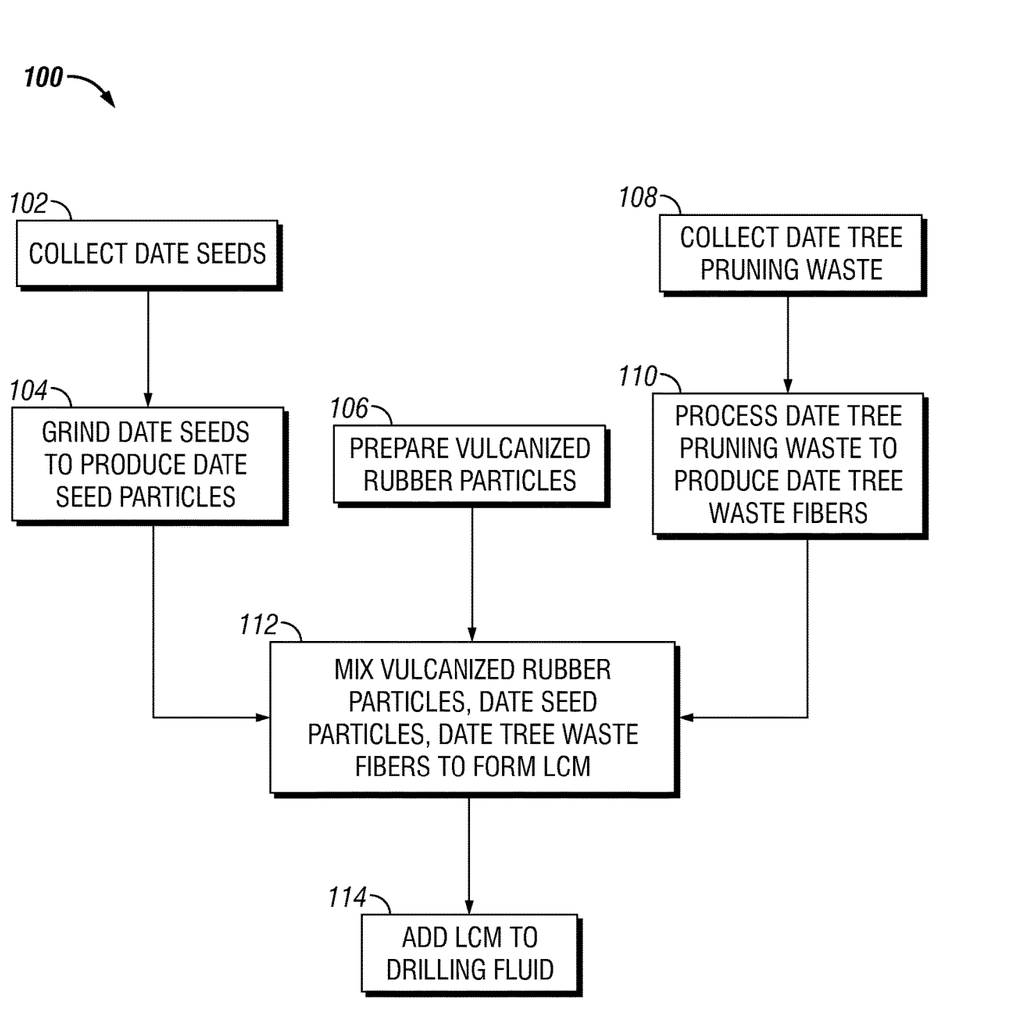
The FIGURE is a process for the production and use of a vulcanized rubber and date tree based LCM formed from vulcanized rubber particles with date tree seed particles and date tree fibers or a combination thereof in accordance with an embodiment of the disclosure.

The present disclosure will be described more fully with reference to the accompanying drawings, which illustrate embodiments of the disclosure. This disclosure may, however, be embodied in many different forms and should not be construed as limited to the illustrated embodiments. Rather, these embodiments are provided so that this disclosure will be thorough and complete, and will fully convey the scope of the disclosure to those skilled in the art.

As a wellbore is drilled, a drilling fluid is continuously pumped into the wellbore to clear and clean the wellbore and the filings. The drilling fluid is pumped from a mud pit into the wellbore and returns again to the surface. A lost circulation zone is encountered when the flow rate of the drilling fluid that returns to the surface is less than the flow rate of the drilling fluid pumped into the wellbore. It is this reduction or absence of returning drilling fluid that is referred to as lost circulation.

Embodiments of the disclosure include a vulcanized rubber and date tree based LCM that includes a mix of vulcanized rubber particles with date tree seed particles or date tree fibers (that is, fibers obtained from date tree components produced as date tree waste) or a combination thereof, to mitigate or prevent lost circulation in a well, as well as provide seepage control and minimize or prevent fluid loss. As used in the disclosure, the term date tree waste refers to the waste produced from farming and processing date trees (also referred to as "date palms"), such as in the production of date fruits (also referred to as "dates"). The date tree fibers may include fibers formed from date tree trunks, date tree rachis, other parts of the date tree, or combinations thereof.

In some embodiments, the vulcanized rubber and date tree based LCM may include vulcanized rubber particles, date tree seeds, and date tree fibers. In such embodiments, the vulcanized rubber and date tree based LCM may include vulcanized rubber particles in the range of 20 pounds-per-barrel (ppb) to 40 ppb in the drilling fluid, date tree seed particles in the range of 50 ppb to 70 ppb in the drilling fluid, and date tree fibers in the range of 10 ppb to 40 ppb in a drilling fluid. In some embodiments, the vulcanized rubber and date tree based LCM may include at least two different sizes of date tree fibers. In such embodiments, the vulcanized rubber and date tree based LCM may include a first size of date tree fibers in the range of 5 ppb to 20 ppb, and a second size of date tree fibers in the range of 5 ppb to 20 ppb. In some embodiments, the vulcanized rubber and date tree based LCM may have a multimodal size distribution. In some embodiments, the vulcanized rubber and date tree based LCM may consist of vulcanized rubber particles, date tree seeds, and date tree fibers without any other components.

In some embodiments, the vulcanized rubber and date tree based LCM may include vulcanized rubber particles and date tree seeds. In such embodiments, the vulcanized rubber and date tree based LCM may include vulcanized rubber particles in the range of 20 pounds-per-barrel (ppb) to 40 ppb in the drilling fluid and date tree seed particles in the range of 50 ppb to 70 ppb in the drilling fluid. In such embodiments, the vulcanized rubber and date tree based LCM may have a bimodal size distribution. In some embodiments, the vulcanized rubber and date tree based LCM may consist of vulcanized rubber particles and date tree seeds without any other components.

In some embodiments, the vulcanized rubber and date tree based LCM may include vulcanized rubber particles and date tree fibers. In such embodiments, the vulcanized rubber and date tree based LCM may include vulcanized rubber particles in the range of 20 pounds-per-barrel (ppb) to 40 ppb in the drilling fluid and date tree fibers in the range of 10 ppb to 40 ppb in a drilling fluid. In some embodiments, the vulcanized rubber and date tree based LCM may include at least two different sizes of date tree fibers. In such embodiments, the vulcanized rubber and date tree based LCM may include a first size of date tree fibers in the range of 5 ppb to 20 ppb, and a second size of date tree fibers in the range of 5 ppb to 20 ppb. In such embodiments, the vulcanized rubber and date tree based LCM may have a bimodal size distribution. In some embodiments, the vulcanized rubber and date tree based LCM may consist of vulcanized rubber particles and date tree fibers without any other components.

The vulcanized rubber particles may include rubber particles produced by vulcanizing natural rubber, synthetic rubber, or a combination thereof. As known in the art, vulcanization includes adding sulfur to rubber with heating to improve the mechanical properties of the rubber by cross-linking polymer chains. It should be appreciated that vulcanization may include additional components, such as accelerators and activators. In some embodiments, the vulcanized rubber particles have a coefficient of resilience in the range of 0.39 to 0.43. In some embodiments, the vulcanized rubber particles have a sieve sizing in the range of mesh no. 30 (0.595 millimeters (mm)) to mesh no. 16 (1.19 mm).

The vulcanized rubber and date tree based LCM includes date tree seed particles formed from ground date tree seeds. In some embodiments, the date tree seed particles may be greater than about 149 microns and less than about 4 millimeters (mm). In some embodiments, the date tree seed particles may be greater than about 1 mm and less than about 2 mm. In some embodiments, the date seed particles may have the sieve sizing shown in Table 1:

TABLE 1

SIEVE SIZING OF DATE SEED PARTICLES

| Mesh No. | Mesh Size (microns) | Typical Percentage | Average Percentage |
|---|---|---|---|
| 5 | 4000 | 100% Passed | 100% Passed |
| 8 | 2380 | 20-40% Retained | 30 ± 10% Retained |
| 12 | 1680 | 10-30% Retained | 20 ± 10% Retained |
| 20 | 841 | 10-20% Retained | 15 ± 5% Retained |
| 30 | 595 | 10-20% Retained | 15 ± 5% Retained |
| 60 | 250 | 5-15% Retained | 10 ± 5% Retained |
| 100 | 149 | 2-8% Retained | 5 ± 3% Retained |
| Pan | <149 | 2-8% | 5 ± 2% |

The vulcanized rubber and date tree based LCM includes date tree waste fibers (that is, fibers formed from date tree waste produced in date production). In some embodiments, the date tree waste is date tree trunks, such that the vulcanized rubber and date tree based LCM includes date tree trunk fibers. In some embodiments, vulcanized rubber and date tree based LCM includes a first group of date tree fibers (referred to in the disclosure as "coarse" date tree fibers) having a size (for example, length) in the range of 250 microns to less than 4000 microns. In some embodiments, the first group of date tree fibers may have the sieve sizing shown in Table 2:

TABLE 2

SIEVE SIZING OF COARSE DATE TREE TRUNK FIBERS

| Mesh Size (microns) | % Retained |
|---|---|
| 4000 | 0.00 |
| 2000 | 6.35 |
| 1000 | 36.21 |
| 600 | 34.77 |
| 250 | 19.32 |
| 10 | 3.35 |

The vulcanized rubber and date tree based LCM composition may include a second group of date tree fibers (referred to in the disclosure as "medium" date tree fibers) having a size (for example, length) in the range of 150 microns to less than 1000 microns. In some embodiments, the second group of date tree fibers may have the sieve sizing shown in Table 3:

TABLE 3

SIEVE SIZING OF MEDIUM DATE TREE TRUNK FIBERS

| Mesh Size (microns) | % Retained |
|---|---|
| 1000 | 4 ± 3 |
| 600 | 20 ± 10% |
| 250 | 52 ± 12% |
| 150 | 20 ± 10% |
| Passing 150 | 4 ± 3% |

In some embodiments, the date tree seeds may include untreated date tree seeds and the date tree waste fibers (for example, date tree trunk fibers) may include untreated date tree waste fibers. As used in the disclosure, the term "untreated" or "without treating" refers to not treated with alkali or acid, not bleached, not chemically altered, not oxidized, and without any extraction or reaction process other than possibly drying of water. The term "untreated" or "without treatments" does not encompass grinding or heating to remove moisture but does encompass chemical or other processes that may change the characteristics or properties of the particles. In such embodiments, the date tree seed particles and date tree waste fibers may be manufactured without treating before, during, or after crushing, grinding, drying, or any other processing.

The FIGURE depicts a process 100 for the production and use of a vulcanized rubber and date tree based LCM in accordance with an example embodiment of the disclosure. As shown in the FIGURE, date tree seeds may be collected (block 102), such as from date tree waste produced by date tree farming and date processing industries. In some embodiments the date tree seeds may be cleaned, such as by a high pressure water or air jet, to remove dirt, dust, and other foreign substances. The collected date tree seeds may be ground to produce particles from the date tree seeds (block 104). In some embodiments, the collected date tree seeds may be ground using a suitable commercial grinder that produces a specific range of particle sizes (for example, diameter).

As also shown in the FIGURE, vulcanized rubber particles may be obtained (block 106). Obtaining the vulcanized rubber particles may include preparing the vulcanized rubber particles from sources of rubber. Preparing the vulcanized rubber particles may include cleaning obtained rubber, such as by a high pressure water or air jet, to remove dirt, dust, and other foreign substances, and separating the rubber from unwanted components (for example, separating metallic components via a magnetic separator). The preparing may include grinding, chopping, or otherwise mechanically processing rubber to produce particles having a specific range of particle sizes (for example, diameter) and vulcanizing the rubber particles using known vulcanization processes.

Additionally, date tree pruning waste may be collected (block 108), such as from waste produced by pruning in date tree farming. The date tree pruning waste may include date tree trunks and other components, such as date tree leaves and date tree rachis. In some embodiments the date tree pruning waste may be cleaned, such as by a high pressure water or air jet, to remove dirt, dust, and other foreign substances. The collected date tree pruning waste may be ground to produce fibers from the date tree pruning waste (block 110). For example, the fibers may include fibers from date tree trunks, other components, or combinations thereof. In some embodiments, the collected date tree pruning waste may be ground using a suitable commercial grinder that produces a specific range of fibers sizes (for example, lengths and diameters).

The date tree seed particles or date tree fibers, or a combination thereof, may be mixed with the vulcanized rubber particles to form a vulcanized rubber and date tree based LCM (block 112). In some embodiments, the mix of date tree seed particles or date tree fibers or a combination thereof and the vulcanized rubber particles may be packed for transportation and use. In some embodiments, a suitable amount of the mix may then be transported to an oil and gas operations site for use as an LCM.

The vulcanized rubber and date tree based LCM may be added directly to a drilling fluid (block 114), such as a drilling mud, to create an altered drilling fluid having the vulcanized rubber and date tree based LCM. For example, in some embodiments, the vulcanized rubber and date tree based LCM may be added to (for example, blended with) an oil-based drilling mud or a water-based drilling mud. In some embodiments, the drilling fluid may be a bentonite mud having freshwater, bentonite, caustic soda (NaOH), and soda ash ($Na_2CO_3$). In some embodiments, the vulcanized rubber and date tree based LCM may be added at the mud pit of a mud system. After addition of the vulcanized rubber and date tree based LCM to a drilling fluid, the altered drilling fluid may be circulated at a pump rate effective to position the drilling fluid into contact with a lost circulation zone in a wellbore, such that the vulcanized rubber and date tree based LCM alters the lost circulation zone (for example, by entering and blocking porous and permeable paths, cracks, and fractures in a formation in the lost circulation zone). The vulcanized rubber and date tree based LCM may form structures (for example, a plug or seal) in the paths, cracks, and fractures or openings thereof in a lost circulation zone to reduce the rate of lost circulation, thus reducing the loss of drilling mud in the lost circulation zone. The vulcanized rubber and date tree based LCM may provide improved seal and plug stability and is adaptable under changing subsurface conditions. In some instances, the relatively rigid components (the date tree seed particles and date tree fibers) of the LCM may act as bridging materials and the relatively resilient components (the vulcanized rubber particles).

In some embodiments, the vulcanized rubber and date tree based LCM may be mixed with a carrier fluid, a viscosifier, or both. In some embodiments, a vulcanized rubber and date tree based LCM homogenous suspension or pill may be formed. For example, a specific carrier fluid, viscosifier, or combination thereof may be selected to form a homogenous suspension or pill having the vulcanized rubber and date tree based LCM. The homogenous suspension or pill may be added to a drilling fluid and used in the manner similar to the vulcanized rubber and date tree based LCM described in the disclosure.

Examples

The following examples are included to demonstrate embodiments of the disclosure. It should be appreciated by those of skill in the art that the techniques and compositions disclosed in the example which follows represents techniques and compositions discovered to function well in the practice of the disclosure, and thus can be considered to constitute modes for its practice. However, those of skill in the art should, in light of the present disclosure, appreciate that many changes can be made in the specific embodiments which are disclosed and still obtain a like or a similar result without departing from the spirit and scope of the disclosure.

The following non-limiting examples of a vulcanized rubber and date tree based LCM were prepared and tested using a 65 pounds per cubic foot (pcf) bentonite mud. Additionally, the non-limiting examples of a vulcanized rubber and date tree based LCM were prepared and evaluated against vulcanized rubber particles in the 65 pcf bentonite mud and date tree seed particles in the bentonite mud. The composition of the 65 pcf bentonite mud is shown in Table 4:

TABLE 4

COMPOSITION OF 65 PCF BENTONITE MUD

| Mud Component | Field Formulation (pounds-per-barrel (ppb)) | Lab Formulation (cubic centimeters (cc) or grams (gm)) |
|---|---|---|
| Freshwater | 0.97 | 339.8 cc |
| Bentonite | 25 | 25 gm |
| Caustic Soda (NaOH) | 0.5 | 0.5 gm |
| Soda Ash ($Na_2CO_3$) | 0.5 | 0.5 gm |

The example vulcanized rubber and date tree based LCMs were prepared by combining different amounts of vulcanized rubber particles to a fluid formed from 350 millimeters (ml) water and 20 ppb of the bentonite mud. Different amounts of the date tree seed particles and two different sizes of date tree fibers were added to form the tested examples. The date seed particles used in the experiment had the sieve sizing shown in Table 5:

TABLE 5

SIEVE SIZING OF DATE SEED PARTICLES

| Mesh No | Micron Size | Typical Percentage | Average Percentage |
|---|---|---|---|
| 5 | 4000 | 100% Passed | 100% Passed |
| 8 | 2380 | 20-40% Retained | 30 ± 10% Retained |
| 12 | 1680 | 10-30% Retained | 20 ± 10% Retained |
| 20 | 841 | 10-20% Retained | 15 ± 5% Retained |
| 30 | 595 | 10-20% Retained | 15 ± 5% Retained |
| 60 | 250 | 5-15% Retained | 10 ± 5% Retained |
| 100 | 149 | 2-8% Retained | 5 ± 3% Retained |
| Pan | <149 | 2-8% | 5 ± 2% |

The experiments used a first size of date tree fibers referred to as "coarse" fibers and a second size of date tree fibers referred to as "medium" fibers. The sieve sizing of the coarse and medium date tree fibers are shown in Tables 6 and 7:

TABLE 6

SIEVE SIZING OF COARSE DATE TREE TRUNK FIBERS

| Mesh Size (Micron) | % Retained |
|---|---|
| 4000 | 0.00 |
| 2000 | 6.35 |
| 1000 | 36.21 |
| 600 | 34.77 |
| 250 | 19.32 |
| 10 | 3.35 |

TABLE 7

SIEVE SIZING OF MEDIUM DATE TREE TRUNK FIBERS

| Mesh Size (microns) | % Retained |
|---|---|
| 1000 | 4 ± 3 |
| 600 | 20 ± 10% |
| 250 | 52 ± 12% |
| 150 | 20 ± 10% |
| Passing 150 | 4 ± 3% |

The example compositions were blended using a low shear mixing apparatus to maintain the size distribution of the composition without any damage or degradation while blending the particles to form a homogeneous mix.

The sealing and plugging capability of the example vulcanized rubber and date tree based LCMs was evaluated using a 2 millimeter (mm) slotted disc and a Permeability Plugging Tester (also referred to as "PPT" or "Pore Plugging Test" apparatus) manufactured by OFI Testing Equipment, Inc., of Houston, Tex., USA. The tests were conducted at conditions of about 212° F. and about 500 psi differential pressure.

The test was conducted using the Permeability Plugging Tester apparatus and the following plugging efficiency test procedure:

1. Set the temperature controller/thermostat to the testing temperature;
2. Check the condition of the O-rings in the groove at the top of the test cell of the Permeability Plugging Tester apparatus and in the cell end cap and replace the O-rings if needed;
3. Apply a thin coating of high temperature grease to all the O-rings, including the two O-rings on the piston of the Permeability Plugging Tester apparatus;
4. Screw the T-bar of the Permeability Plugging Tester apparatus into the piston, install into the bottom end of the test cell, position the piston about 1 inch into the cell bore, and remove the T-bar;
5. Add a volume of hydraulic oil to the test cell using the hydraulic hand pump of the Permeability Plugging Tester apparatus;
6. Install all the O-rings and secure the end cap of the cell in position such that oil flows from the hole in the end cap to ensure no air is trapped;
7. Install the valve stem into the bottom end cap of the cell, tighten the valve stem, and disconnect from the hydraulic hand pump of the Permeability Plugging Tester apparatus;
8. Place the cell upright on a suitable stand;
9. Pour a sample to be tested into the test cell;
10. Install an O-ring into the top of the cell below the 2 mm slotted disc;
11. Place the 2 mm slotted disc on top of the O-ring;
12. Insert the end cap on the top of the disc, screw down the threaded retaining ring, and fully tighten;
13. Tighten the top stem of the test cell;
14. Place the cell into the heating jacket of the Permeability Plugging Tester apparatus;
15. Connect a pressure hose from the hydraulic hand pump to the bottom of the test cell via a quick connector and ensure the bottom stem is closed;
16. Connect the back pressure hose/sample collector to the top stem of the test cell, ensuring that the locking pin is in place, close the pressure relief valve on the side of the hydraulic hand pump, apply the testing pressure via the back pressure regulator to the top of the test cell, and close the top valve.
17. Place a thermometer into the hole at the top of the test cell. wait until the testing temperature is reached, and monitor the cell pressure while heating and bleed off pressure if necessary by opening the pressure relived valve on the side of the hydraulic hand pump;
18. Once the test sample has reached the testing temperature, pump the hydraulic hand pump until the pump gauge shows the testing pressure plus the required back pressure;
19. Apply the required back pressure to the top of the cell, open the top valve, and pump the hydraulic hand pump to reestablish the testing pressure;
20. To determine the spurt volume, collect the fluid from the back pressure collector in a measuring cylinder and record the amount, ensuring that all the fluid has been expelled;
21. Collect the fluid periodically over a 30 minute time period and check the back pressure gauge to ensure that the pressure remains less than the pressure threshold (about 3000 psi) of the built-in safety disc of the Permeability Plugging Tester apparatus and avoid expulsion of hot hydraulic oil;
22. Record the total fluid loss over the 30 minute time period.

Table 8 shows the results of plugging efficiency tests for the example vulcanized rubber and date tree based LCM at different concentrations of vulcanized rubber particles and date tree seed particles, and different sizes and concentrations of date tree fibers. Table 8 also shows the results for vulcanized rubber particles at 20 ppb and 40 ppb concentrations in the bentonite mud, and date tree seed particles in a 60 ppb concentration in the bentonite mud, with total loss measured in cubic centimeters (cc):

TABLE 8

PLUGGING EFFICIENCY TEST RESULTS WITH VULCANIZED RUBBER
PPT Results with Bentonite Mud

| | Concentration (ppb) | | | | |
|---|---|---|---|---|---|
| Test # | Vulcanized rubber | Date seed particles | Date tree fibers (coarse) | Date tree fibers (medium) | Total loss (cc) |
| 1 | 20 | 0 | 0 | 0 | Total loss |
| 2 | 40 | 0 | 0 | 0 | Total loss |
| 3 | 0 | 60 | 0 | 0 | 125 |
| 4 | 20 | 20 | 10 | 0 | 110 |
| 5 | 20 | 20 | 10 | 10 | 60 |

As shown in Table 8, the use of vulcanized rubber particles alone in in both 20 ppb and 40 ppb concentrations resulted in a total loss of the bentonite mud. The use of date tree seed particles alone resulted in a 125 cc loss of bentonite mud. In contrast, the vulcanized rubber and date tree based LCM examples were able to significantly reduce the loss of the bentonite mud. As shown in Table 8, the example vulcanized rubber and date tree based LCM having 20 ppb date tree seed particles and 10 ppb coarse-sized date tree fibers resulted in a 110 cc loss of bentonite mud, while the example vulcanized rubber and date tree based LCM having 20 ppb date tree seed particles, 10 ppb coarse-sized date tree fibers, and 10 ppb medium-sized date tree fibers resulted in a 60 cc loss of bentonite mud. The test results show that the example vulcanized rubber and date tree based LCM having date tree seed particles, coarse-sized date tree fibers, and medium-sized date tree fibers provides improved reduction in loss of circulation due to the combination of rigid and resilient particles and fibers.

The sealing and plugging capability of non-vulcanized rubber obtained from scrap tires was also evaluated using the 2 millimeter (mm) slotted disc and the PPT apparatus according to the procedure described supra. The tests were conducted at conditions of about 212° F. and about 500 psi differential pressure.

Table 9 shows the results of plugging efficiency tests for the non-vulcanized rubber at a concentration of 20 ppb in the bentonite mud, with concentrations of 20 ppb of date tree seed particles, 10 ppb of coarse date tree fibers, and 10 ppb of medium date tree fibers, with total loss measured in cc:

TABLE 9

PLUGGING EFFICIENCY TEST RESULTS WITH NON-VULCANIZED RUBBER
PPT Results with Bentonite Mud

| Test # | Concentration (ppb) | | | | Total loss (cc) |
| --- | --- | --- | --- | --- | --- |
| | Vulcanized rubber | Date seed particles | Date tree fibers (coarse) | Date tree fibers (medium) | |
| 1 | 20 | 20 | 10 | 10 | 150 |

As shown in Table 9, at similar concentrations as the vulcanized rubber and with the same components the non-vulcanized rubber exhibits over twice as much fluid loss during the plugging efficiency test.

A resiliency test was also conducted on three samples of vulcanized rubber and samples of non-vulcanized rubber. Each sample was subjected to strain percentages of 20% (test A) and 40% (test B). Table 10 shows the results of the resiliency test for vulcanized rubber as expressed by the coefficient of resilience, with the compressive load measured in kilograms-force (kgf), the distance at selected strain % measured in mm, and the area under the load-displacement curve in kgf·mm:

TABLE 10

RESILIENCY TEST RESULTS FOR VULCANIZED RUBBER

| # | Material | % Strain | Compressive Load (kgf) | Distance at selected % strain (mm) | Area A (kgf · mm) | Area B (kgf · mm) | Coefficient of Resilience |
| --- | --- | --- | --- | --- | --- | --- | --- |
| A | Vulcanized | 20 | 8.7 | 10.19 | 32.83 | 12.91 | 0.39 |
| B | Rubber | 40 | 51.1 | 20.14 | 285.39 | 121.79 | 0.43 |

Table 11 shows the results of the resiliency test for non-vulcanized rubber as expressed by the coefficient of resilience, with the compressive load measured in kgf, the distance at selected strain % measured in mm, and the area under the load-displacement curve in kgf·mm:

TABLE 11

RESILIENCY TEST RESULTS FOR VULCANIZED RUBBER

| # | Material | % Strain | Compressive Load (kgf) | Distance at selected % strain (mm) | Area A (kgf · mm) | Area B (kgf · mm) | Coefficient of Resilience |
| --- | --- | --- | --- | --- | --- | --- | --- |
| A | Non-vulcanized | 20 | 8.7 | 9.22 | 8.127 | 2.342 | 0.288 |
| B | Rubber | 40 | 51.1 | 18.59 | 108.326 | 39.305 | 0.362 |

Tables 10 and 11 show that the vulcanized rubber particles used in the example vulcanized rubber and date tree based LCM have improved resilient characteristics that increase with an increase in strain percentage, as compared to the non-vulcanized rubber. These resilient characteristics demonstrate that a structure (for example, plug or seal) formed from the example vulcanized rubber and date tree based LCM may have sufficient resilient characteristics to recover from or avoid any damage or degradation to the structure under changing subsurface conditions.

Ranges may be expressed in the disclosure as from about one particular value, to about another particular value, or both. When such a range is expressed, it is to be understood that another embodiment is from the one particular value, to the other particular value, or both, along with all combinations within said range.

Further modifications and alternative embodiments of various aspects of the disclosure will be apparent to those skilled in the art in view of this description. Accordingly, this description is to be construed as illustrative only and is for the purpose of teaching those skilled in the art the general manner of carrying out the embodiments described in the disclosure. It is to be understood that the forms shown and described in the disclosure are to be taken as examples of embodiments. Elements and materials may be substituted for those illustrated and described in the disclosure, parts and processes may be reversed or omitted, and certain features may be utilized independently, all as would be apparent to one skilled in the art after having the benefit of this description. Changes may be made in the elements described in the disclosure without departing from the spirit and scope of the disclosure as described in the following claims. Headings used in the disclosure are for organizational purposes only and are not meant to be used to limit the scope of the description.

What is claimed is:

1. A method to prevent lost circulation of a drilling fluid in a wellbore, comprising:
   introducing an altered drilling fluid into the wellbore such that the altered drilling fluid contacts the lost circulation zone and reduces a rate of lost circulation into the lost circulation zone, wherein the altered drilling fluid comprises a drilling fluid and a lost circulation material (LCM), wherein the LCM consists of:
   a plurality of particles produced from date tree seeds, wherein each of the plurality of particles produced from date tree seeds has a diameter in the range of greater than 149 microns to less than 4000 microns;
   a plurality of vulcanized rubber particles, wherein each of the plurality of vulcanized rubber particles has a size in the range of 0.595 millimeters to 1.19 mm and a coefficient of resiliency in the range of 0.39 to 0.43; and
   a plurality of fibers produced from date tree trunks, wherein the plurality of fibers produced from date tree trunks comprises a first group of fibers each having a size in the range of 250 microns to less than 4000 microns and a second group of fibers each having a size in the range of 150 microns to less than 1000 microns.

2. The method of claim 1, wherein the altered drilling fluid consists of the drilling fluid and the LCM.

3. The method of claim 1, wherein the drilling fluid comprises a water-based drilling mud or an oil-based drilling mud.

4. The method of claim 1, wherein the plurality of particles produced from date tree seeds is in the range of 50 pounds-per-barrel (ppb) to 70 ppb in the altered drilling fluid, the plurality of vulcanized rubber particles is in the range of 20 ppb to 40 ppb in the altered drilling fluid, and the plurality of fibers produced from date tree trunks is in the range of 10 ppb to 40 ppb in the altered drilling fluid.

5. The method of claim 1, wherein the plurality of fibers produced from date tree trunks comprises a plurality of untreated fibers produced from untreated date tree trunks.

6. An altered drilling fluid, comprising:
   a drilling fluid; and
   a lost circulation material (LCM), wherein the LCM consists of:
   a plurality of particles produced from date tree seeds, wherein each of the plurality of particles produced from date tree seeds has a diameter in the range of greater than 149 microns to less than 4000 microns;
   a plurality of vulcanized rubber particles, wherein each of the plurality of vulcanized rubber particles has a size in the range of 0.595 millimeters to 1.19 mm and a coefficient of resiliency in the range of 0.39 to 0.43; and
   a plurality of fibers produced from date tree trunks, wherein the plurality of fibers produced from date tree trunks comprises a first group of fibers each having a size in the range of 250 microns to less than 4000 microns and a second group of fibers each having a size in the range of 150 microns to less than 1000 microns.

7. The altered drilling fluid of claim 6, wherein the drilling fluid comprises a water-based drilling mud or an oil-based drilling mud.

8. The altered drilling fluid of claim 6, wherein the plurality of particles produced from date tree seeds is in the range of 50 pounds-per-barrel (ppb) to 70 ppb in the altered drilling fluid, the plurality of vulcanized rubber particles is in the range of 20 ppb to 40 ppb in the altered drilling fluid, and the plurality of fibers produced from date tree trunks is in the range of 10 ppb to 40 ppb in the altered drilling fluid.

9. A lost circulation material (LCM) composition, the composition consisting of:
   a plurality of particles produced from date tree seeds, wherein each of the plurality of particles produced from date tree seeds has a diameter in the range of greater than 149 microns to less than 4000 microns;
   a plurality of vulcanized rubber particles, wherein each of the plurality of vulcanized rubber particles has a size in the range of 0.595 millimeters to 1.19 mm and a coefficient of resiliency in the range of 0.39 to 0.43; and
   a plurality of fibers produced from date tree trunks, wherein the plurality of fibers produced from date tree trunks comprises a first group of fibers each having a size in the range of 250 microns to less than 4000 microns and a second group of fibers each having a size in the range of 150 microns to less than 1000 microns.

10. The lost circulation material (LCM) composition of claim 9, wherein the plurality of particles produced from date tree seeds is in the range of 50 pounds-per-barrel (ppb) to 70 ppb in the altered drilling fluid, the plurality of vulcanized rubber particles is in the range of 20 ppb to 40 ppb in the altered drilling fluid, and the plurality of fibers produced from date tree trunks is in the range of 10 ppb to 40 ppb in the altered drilling fluid.

11. A method of manufacturing a lost circulation material (LCM), comprising:
   processing date tree seeds to produce a plurality of particles produced from date tree seeds, wherein each of the plurality of particles produced from date tree seeds has a diameter in the range of greater than 149 microns to less than 4000 microns;
   processing date tree trunks to produce a plurality of fibers, wherein the plurality of fibers produced from date tree trunks comprises a first group of fibers each having a size in the range of 250 microns to less than 4000 microns and a second group of fibers each having a size in the range of 150 microns to less than 1000 microns;

obtaining a plurality of vulcanized rubber particles, wherein each of the plurality of vulcanized rubber particles has a size in the range of 0.595 millimeters to 1.19 mm and a coefficient of resiliency in the range of 0.39 to 0.43; and mixing the plurality of particles, the plurality of fibers, and the plurality of vulcanized rubber particles to form the LCM.

12. The method of claim 11, wherein processing the date tree seeds to produce the plurality of particles comprises grinding the date tree seeds.

* * * * *